US007299246B1

(12) United States Patent
Eatough

(10) Patent No.: US 7,299,246 B1
(45) Date of Patent: Nov. 20, 2007

(54) CLIENT INITIATED MULTICAST DOMAIN DISCOVERY

(75) Inventor: David A. Eatough, Herriman, UT (US)

(73) Assignee: LANDesk Software Limited, Dublin (IE)

( * ) Notice: Subject to any disclaimer, the term of this patent is extended or adjusted under 35 U.S.C. 154(b) by 470 days.

(21) Appl. No.: 10/759,711

(22) Filed: Jan. 16, 2004

(51) Int. Cl.
*G06F 17/00* (2006.01)
(52) U.S. Cl. .................... 707/104.1; 707/100; 709/232
(58) Field of Classification Search ......... 707/1–104.1; 709/232
See application file for complete search history.

(56) References Cited

U.S. PATENT DOCUMENTS

| | | | | |
|---|---|---|---|---|
| 6,085,238 | A | * | 7/2000 | Yuasa et al. ................. 709/223 |
| 6,331,983 | B1 | * | 12/2001 | Haggerty et al. ............ 370/400 |
| 6,611,510 | B2 | * | 8/2003 | Famolari et al. ............ 370/335 |
| 6,674,756 | B1 | * | 1/2004 | Rao et al. ............... 370/395.21 |
| 6,690,659 | B1 | * | 2/2004 | Ahmed et al. .............. 370/328 |
| 2002/0009073 | A1 | * | 1/2002 | Furukawa et al. ........... 370/352 |
| 2002/0150094 | A1 | * | 10/2002 | Cheng et al. ................ 370/389 |
| 2002/0178235 | A1 | * | 11/2002 | Ueno et al. ................. 709/217 |
| 2003/0039215 | A1 | | 2/2003 | Eatough et al. |
| 2004/0022244 | A1 | * | 2/2004 | Boers et al. ................ 370/390 |
| 2006/0034278 | A1 | * | 2/2006 | Hundscheidt et al. ....... 370/390 |

OTHER PUBLICATIONS

"Greedy Algorithms," http://www.cs.man.as.uk/~graham/cs2022/greedy/index.html, pp. 1-2, Jul. 8, 2003.
"Minimum Spanning Tree Demonstration Program," http://www.cs.oregonstate.edu/~minoura/cs261/javaProgs/minST/MinST.html, pp. 1-2, Jul. 8, 2003.
"10 Graphs," http://ciips.ee.uwa.edu.au/~morris/Year2/PLDS210/mst.html, pp. 1-5, Jul. 8, 2003.
ICS 161: Design and Analysis of Algorithms Lecture Notes for Feb. 6, 1996, http://www.ics.uci.edu/~eppstein/161/960206.html, pp. 1-5, Jul. 8, 2003.
"Unix Manual Page—Traceroute," http://www.cebitec.uni-bielefeld.de/cgi-bin/man.cgi?section=1M&topic=traceroute, no date.

* cited by examiner

*Primary Examiner*—Don Wong
*Assistant Examiner*—Linh Black
(74) *Attorney, Agent, or Firm*—Madson & Austin

(57) ABSTRACT

A system for determining a multicast domain for a node on a computer network is disclosed. The system includes a computing device and a computer-readable medium. The computer-readable medium is part of the computing device or is in electronic communication with the computing device. The computer-readable medium comprises executable instructions for implementing a method for determining the multicast domain for the computing device. A destination is obtained that comprises a computer on the computer network. A unique identification is determined for a first router encountered when sending data from the computing device to the destination. A multicast domain identification is prepared based on the unique identification determined. The multicast domain identification is sent to an administrative system on the computer network.

14 Claims, 10 Drawing Sheets

CLIENT INITIATED MULTICAST DOMAIN DISCOVERY

TECHNICAL FIELD

The present invention relates generally to computer system administration. More specifically, the present invention relates to client initiated multicast domain discovery.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or problems with existing systems, may cause down-time during which the business or individual operate at diminished levels or are otherwise unable to use the computers as they typically do. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time.

Benefits may be realized by providing increased functionality to assist in computer maintenance and support.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
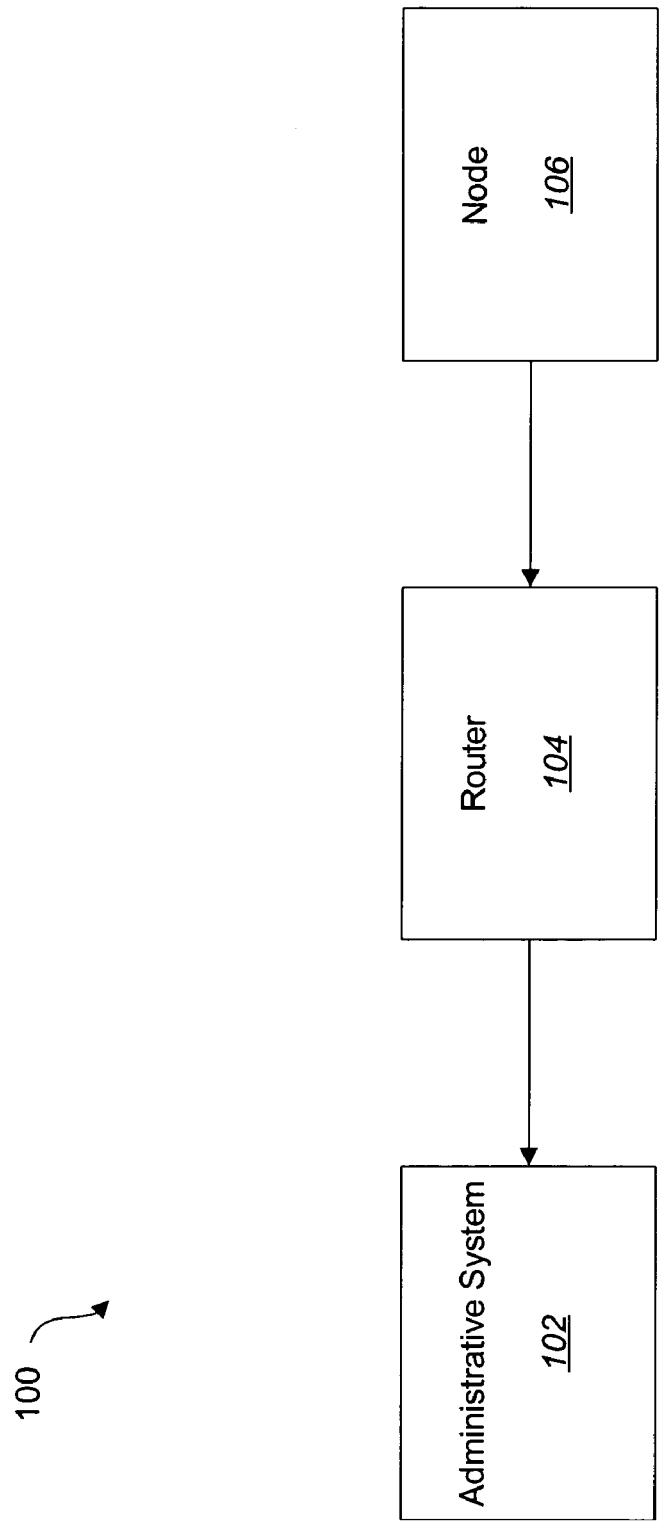
FIG. 1 is a block diagram of an embodiment of a system for client initiated multicast domain discovery.

A method for determining a multicast domain for a node on a computer network is disclosed. A destination is obtained comprising a computer on a computer network. A unique identification is determined for a first router encountered when sending data from a node to the destination. A multicast domain identification is prepared based on the unique identification determined. The multicast domain identification is provided to a central location.

In an embodiment, a specific port of the first router encountered is determined and a specific port identification is included in the multicast domain identification. The multicast domain identification may comprise a router or similar network device identification and a port identification.

In a further embodiment the central location may include an administrative system that includes a database of multicast domains.

In certain embodiments a multicast domain cache may be used. Files may be reported that are in a multicast domain cache.

A computer-readable medium for storing program data is also disclosed. The program data includes executable instructions for implementing a method in a computing device for determining a multicast domain for a node on a computer network. In the method a destination is obtained comprising a computer on a computer network. A unique identification is determined for a first router encountered when sending data from a node to the destination. A multicast domain identification is prepared based on the unique identification determined. The multicast domain identification is provided to a central location.

A system for determining a multicast domain for a node on a computer network is also disclosed. The system includes a computing device and a computer-readable medium. The computer-readable medium is part of the computing device or is in electronic communication with the computing device. The computer-readable medium comprises executable instructions for implementing a method for determining the multicast domain for the computing device. A destination is obtained that comprises a computer on the computer network. A unique identification is determined for a first router encountered when sending data from the computing device to the destination. A multicast domain identification is prepared based on the unique identification determined. The multicast domain identification is sent to an administrative system on the computer network.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order unless explicitly stated herein.

Although the embodiments herein are described with reference to multicast jobs, they may be applied to broadcast jobs, point to multipoint, and multipoint to multipoint jobs as well.

A multicast alias domain consists of all computers that can see each other's multicast traffic without crossing a router. Another possible definition is that a multicast domain consists of all computers where the IP hop count between any two computers is zero. Because the hop count between all machines in a multicast domain is zero the arrangement of the machines within the multicast domain does not typically matter. One approach for determining alias domains is described in U.S. patent application Ser. No. 09/927,708, filed Aug. 10, 2001 and entitled "Method and Apparatus for Dynamically Discovering Alias Domains," hereby incorporated by reference in its entirety. This multicast domain discovery process is controlled from a central server and involves iterating through all subnets to determine the multicast domains.

The embodiments herein use multicast alias domains. However, these embodiments may also use other multipoint communication domains rather than multicast alias domains. For example, the techniques herein may be used with broadcast domains or any other multipoint communication domains.

This system provides a method for multicast domain discovery that allows the individual client computers or nodes to determine their own multicast domain and report the information to a central location, referred to herein as the administrative system 102. FIG. 1 is a block diagram of an embodiment of a system 100 for client initiated multicast domain discovery. In an embodiment of the method, the system 100 uniquely identifies the multicast alias domain by the IP address and name of the first router 104 encountered when sending a packet to a known destination, which is the administrative system 102 in FIG. 1, from the individual node 106.

A known destination node or computer is used when sending a packet to identify a multicast domain. All of the nodes in the same multicast domain will encounter the same router when sending a packet to the same destination node; thus, they will report the same router name and IP address for the first router encountered and will be labeled as being in the same multicast alias domain.

The multicast alias domain can then be reported to the administrative system 102 through one or more messages, an inventory scan, or similar means. In addition to reporting the alias domain the node 106 can also report files that are currently in the multicast cache, shown in FIG. 3.

Figure 2:
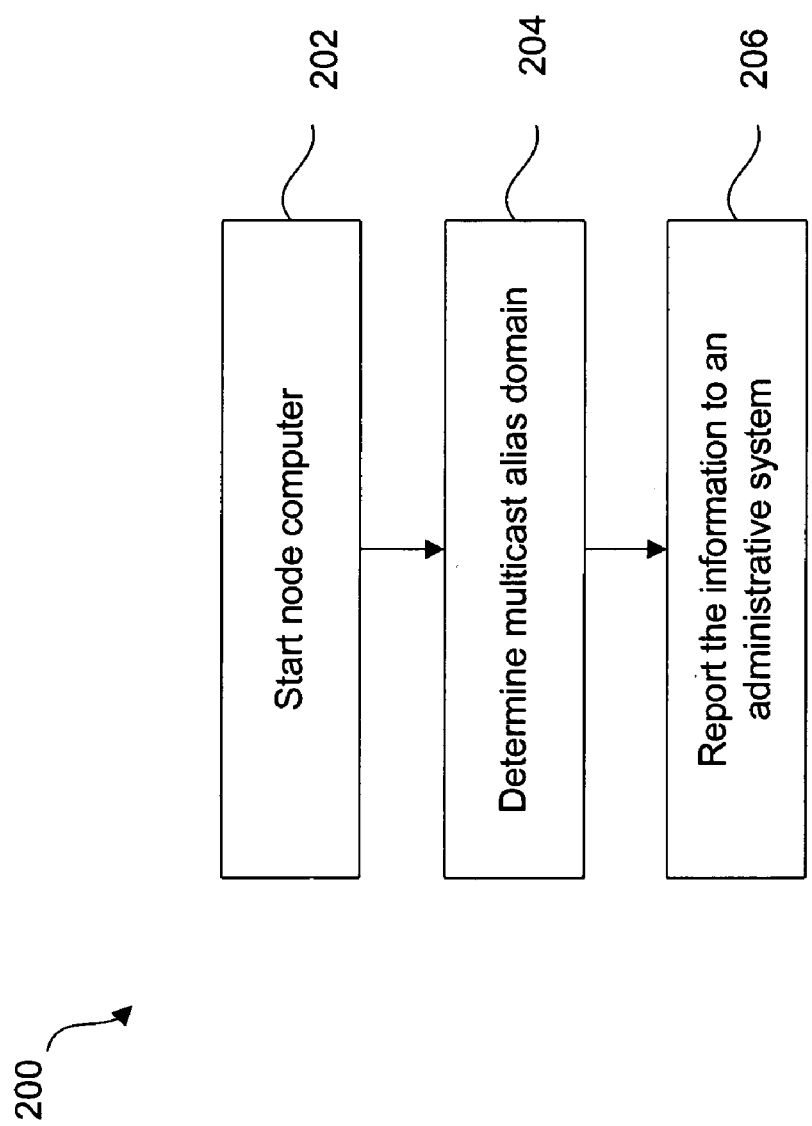
FIG. 2 is a flow diagram illustrating client initiated multicast domain discovery.

FIG. 2 is a flow diagram 200 illustrating client initiated multicast domain discovery. Some time after the node computer 106 is started 202, it may determine 204 its own multicast alias domain. Once the node 106 has its own multicast alias domain, it may report 206 that information to the administrative system 102. The administrative system 102 may serve as a central location for storing the information. The information that may be stored and conveyed to the administrative system 102 is shown in FIG. 3.

Figure 3:
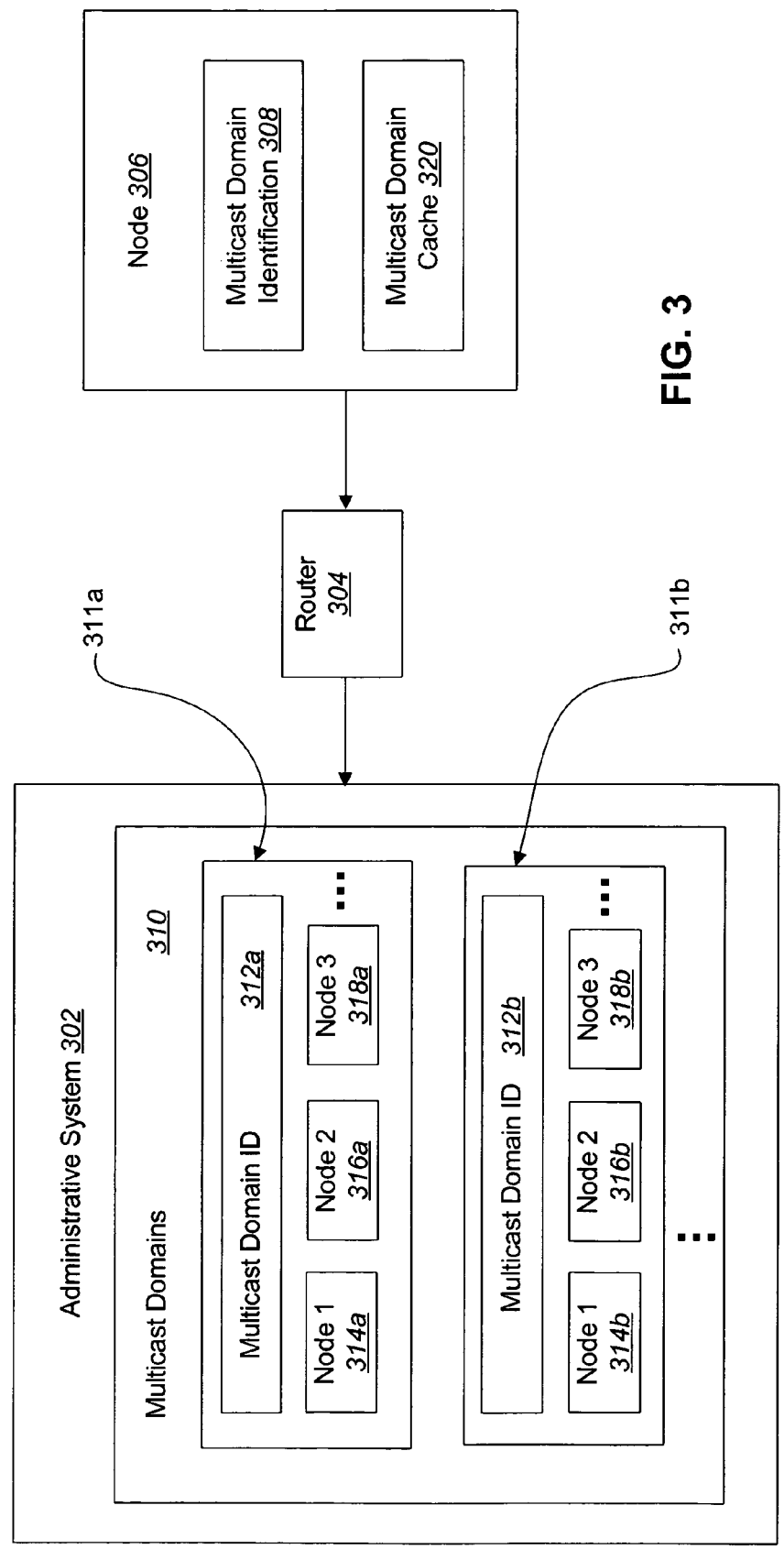
FIG. 3 is a block diagram illustrating data that may be stored and reported to the administrative system.

FIG. 3 is a block diagram illustrating data that may be stored and reported to the administrative system 302. The multicast domain identification 308 identifies what multicast domain the node 306 belongs to. The node 306 initially obtains this information and transmits it to an administrative system 302. The administrative system 302 stores the information it receives from the node 306. In most systems there will be many nodes 306 on a computer network reporting their multicast domain identifications 308 to the administrative system 302. As a result, the administrative system 302 typically stores all the multicast domain information in a multicast domain database 310. The multicast domain database 310 may include a plurality of multicast domain records 311 corresponding to the various multicast domains. The multicast domain database 310 may also contain other information not related to multicast domains, such as inventory information. The multicast domain database 310 includes the multicast domain identifications 312 it receives along with node identifications 314, 316, 318 to identify what nodes belong to each multicast domain. Each multicast domain identification 312 may be associated with one or more node identifications 314, 316, 318 for the nodes that belong to that multicast domain.

One or more nodes 306 may use some storage for a multicast domain cache 320. The multicast domain cache 320 comprises storage for electronic files or data that may be needed by the administrative system 302 or other nodes 306. When the node 306 reports its multicast domain identification 308 to the administrative system 302, it may also report the contents of its multicast domain cache 320, if it has one.

Figure 4:
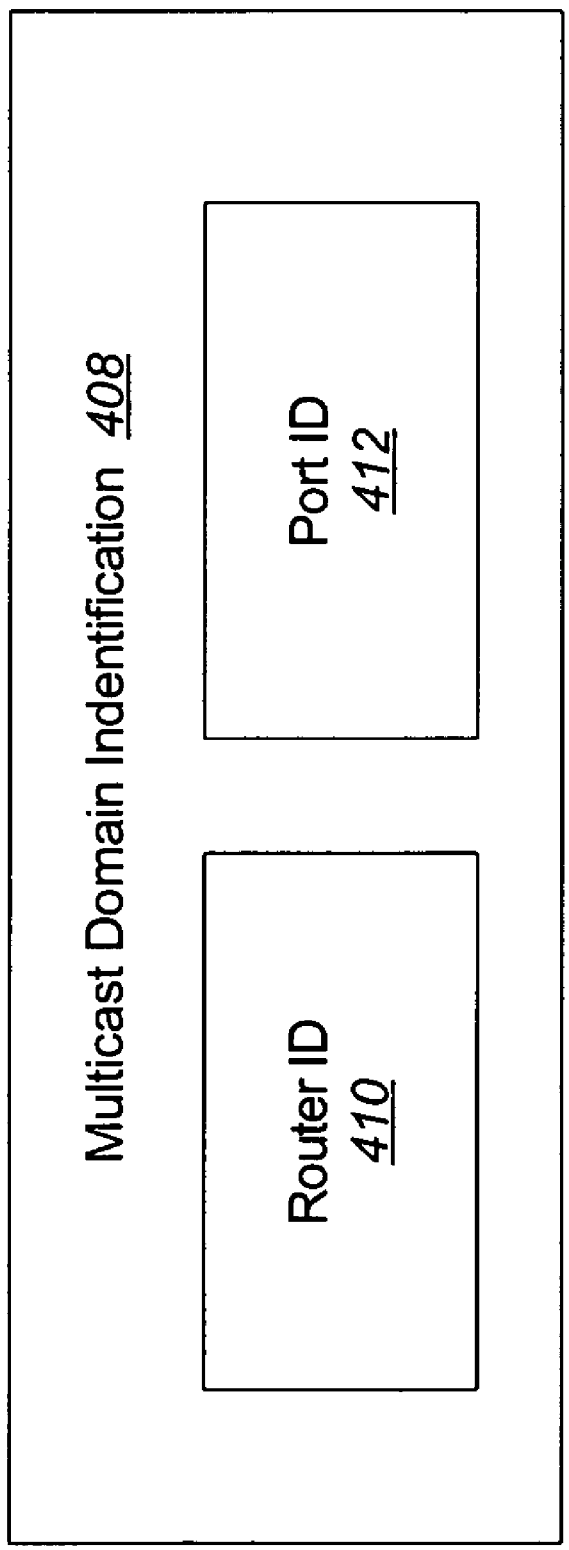
FIG. 4 is a block diagram of an embodiment of a multicast domain identification.

FIG. 4 is a block diagram of an embodiment of a multicast domain identification 408. The multicast domain identification 408 may be any piece of data that identifies a multicast domain. For example, the multicast domain identification 408 may include a router identification 410 that identifies the first router 104 encountered by a packet sent to the administrative system 102 (or another predetermined destination). The router identification 410 may be a name, number, MAC address, etc. A port identification 412 may identify the port of the router that the packet came in through.

Figure 5:
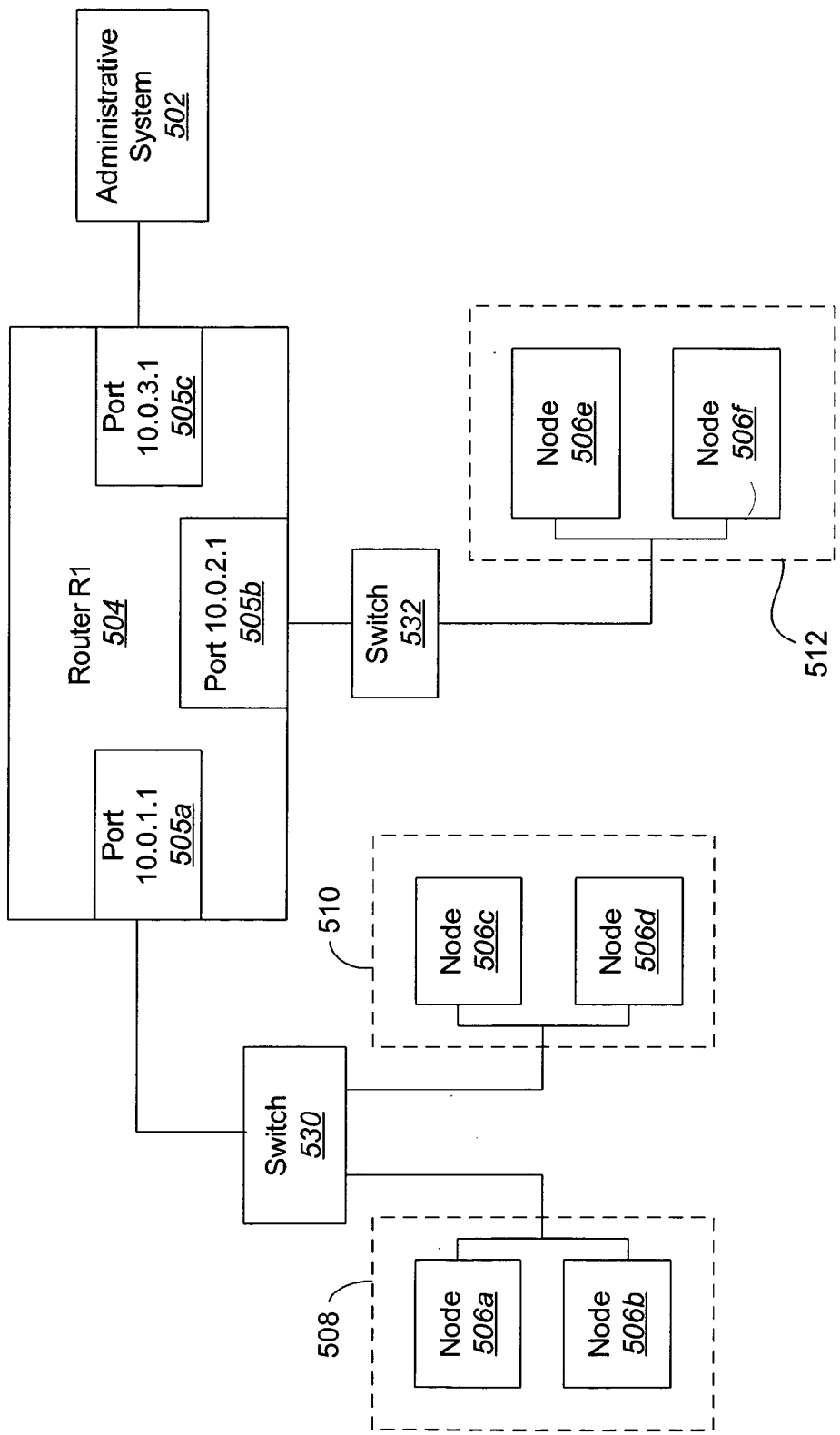
FIG. 5 is a block diagram of a system being used with multiple subnets.

FIG. 5 illustrates an embodiment used with multiple subnets 508, 510, 512. In some of the diagrams herein the networks are represented using two octets. The algorithm outlined will work for IP addresses as well. A first subnet 508 and a second subnet 510 are in communication with the router 504 via a first switch 530. A third subnet 512 is in communication with the router 504 via a second switch 532.

The router 504 may have one or more ports 505. The router 504 illustrated has three ports: port 10.0.1.1 505a, port 10.0.2.1 505b and port 10.0.3.1 505c. Even though these ports are identified using an IP address notation, any method of uniquely identifying the ports may be used. Various computers, computing devices and/or network devices may be connected to the router 504.

The nodes 506 in all three subnets 508, 510, 512 will determine the first hop on the route to the administrative system 502. For nodes in the first and second subnets 508, 510 it will be the 10.0.1.1 port 505a of the router 504 and so, in one embodiment, they may report their multicast alias domain using a multicast domain identification as R1-10.0.1.1 (router identification 410 and port identification 412). Nodes 506 in the third subnet 512 will encounter the 10.0.2.1 port 505b of the router 504 when tracing the route to the administrative system 502 and may report their multicast alias domain as R1-10.0.2.1.

The switches 530, 532 do not change the IP hop count, and hence do not impact the multicast domain configuration. Since the nodes 506 are looking for the first network device that decrements the IP address count they will not identify the switch 530, 532. Those familiar with the art will realize that there are known techniques for finding the first network device that decrements the IP address. The Traceroute program demonstrates one such technique for finding the first device that decrements the IP hop count. Details of this technique can be found in TCP/IP Illustrated, Volume 1 by W. Richard Stevens, hereby incorporated by reference in its entirety.

In implementing the algorithm for determining which multicast domain a node belongs to, the systems herein instruct all the nodes to use the same computer (which may be the administrative system) as a destination for determining a route. The first router that is encountered in the route to the destination is identified and may be used in identifying the multicast domain.

Network environments that contain multiple routers or computers with multiple network cards require all managed nodes to use the same destination when determining their multicast domain. Using the same destination means that they will send their packet to the same well known computer. Without the same destination, issues may arise resulting in unwanted results. Without the same destination, there is no guarantee that the same router will always be encountered. Consider the network shown in FIG. 6 which shows a computer 606 with multiple network cards.

Figure 6:
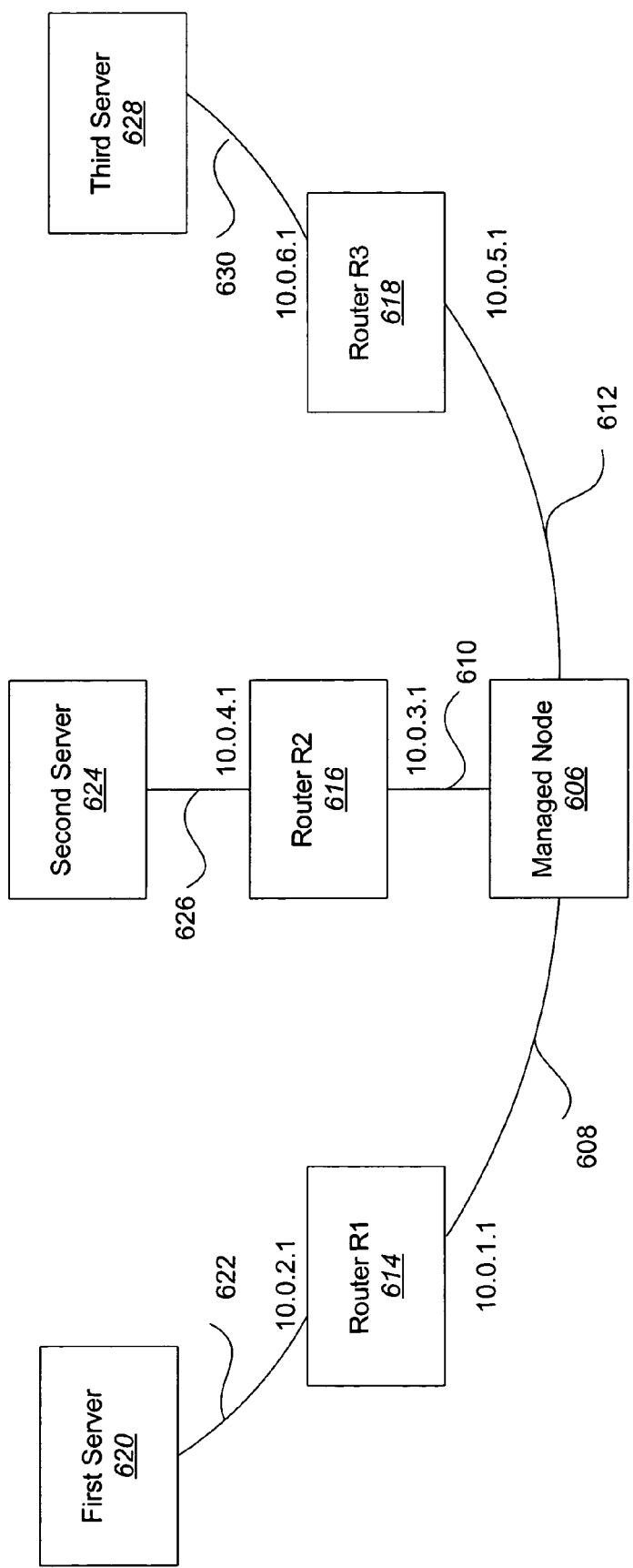
FIG. 6 is a block diagram illustrating a node connected to multiple networks.

In FIG. 6, the managed node 606 is connected to three networks 10.0.01.1 608, 10.0.3.1 610 and 10.0.5.1 612. Each of these networks is connected to a router 614, 616, 618. There are three servers. A first server 620 is connected to the first router 614 via network 10.0.2.1 622. A second server 624 is connected to the second router 616 via network 10.0.4.1 626. A third server 628 is connected to the third router 618 via network 10.0.6.1 630. Depending upon the server to which a packet is sent, any one of these three networks may be used. Without a specific well known destination to which a packet is to sent the multicast domain name for the node 606 could be R1-10.0.1.1, R2-10.0.3.1, or R3-10.0.5.1. Once a well known destination, for example the second server 624, is selected only one multicast domain name is possible.

Figure 7:
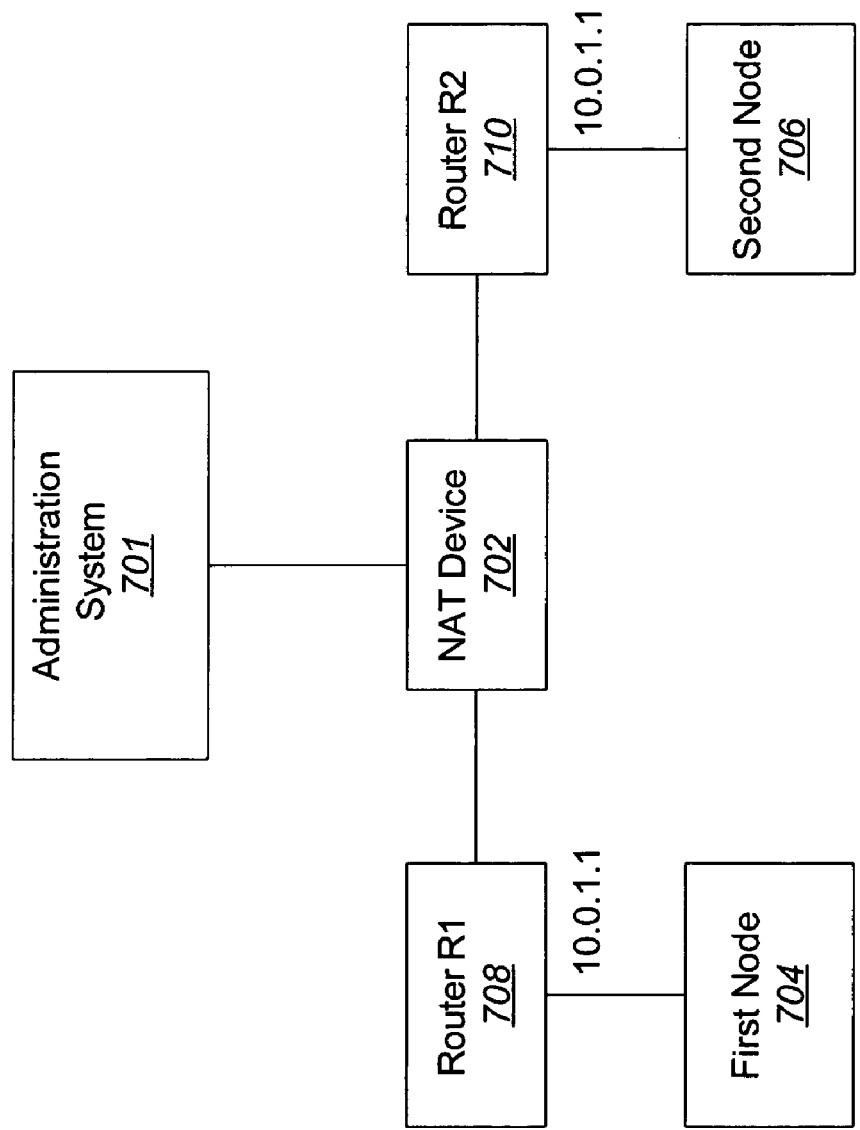
FIG. 7 is a block diagram of a system being used with a Network Address Translation device.

FIG. 7 is a block diagram of a system being used with a Network Address Translation device 702. The name of the router may be included in the multicast domain identification 308 to handle the situation where Network Address Translation (NAT) devices 702 are used in the network as shown in the diagram of FIG. 7. The NAT device 702 is in electronic communication with a first node 704 and a second node 706 through a first router 708 and a second router 710, as shown. The NAT device 702 makes it possible for two portions of the network to reuse the same network address. Thus as far as the two managed nodes 704, 706 are concerned they are both on network 10.0.1.1 and the address of the router they first encounter is 10.0.1.1. If only the address of the router was used these nodes 704, 706 would incorrectly identify their multicast alias domains. In order to resolve this problem the name of the router is added the multicast alias domain, thus the first node 704 is in the R1-10.0.1.1 multicast alias domain and the second node 706 is in the R2-10.0.1.1 multicast alias domain, which allows for unique multicast domain names even within a NAT environment.

The name of the router is used for illustration purposes only; any unique attribute of the router could be included in the domain name. Unique attributes of a router may include the name, serial number, MAC address, and so on.

The systems and methods herein of client initiated multicast domain discovery offer the advantage of not needing a centralized server to control the discovery. Additionally because this solution can store the multicast domain information directly in a database there is no need for the administrative system to perform any additional discovery tasks, which greatly reduces the time it takes to perform multicast.

Figure 8:
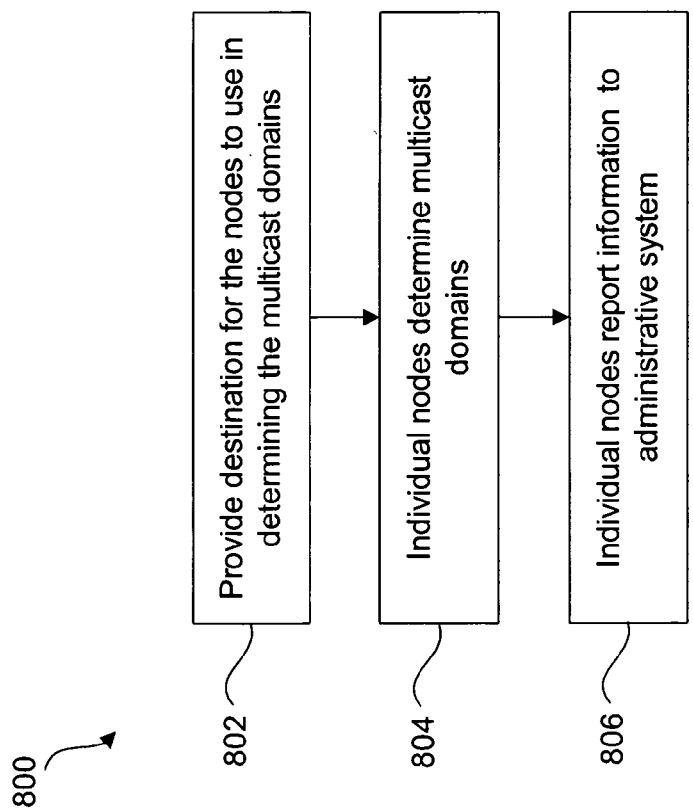
FIG. 8 is a flow diagram of a method for client initiated multicast domain discovery.

FIG. 8 is a method 800 for the system where managed nodes determine their multicast domains. A destination for the nodes to use in determining the multicast domains is provided 802. The individual nodes then determine 804 their own multicast domains and report 806 that information to an administrative system 102.

Figure 9:
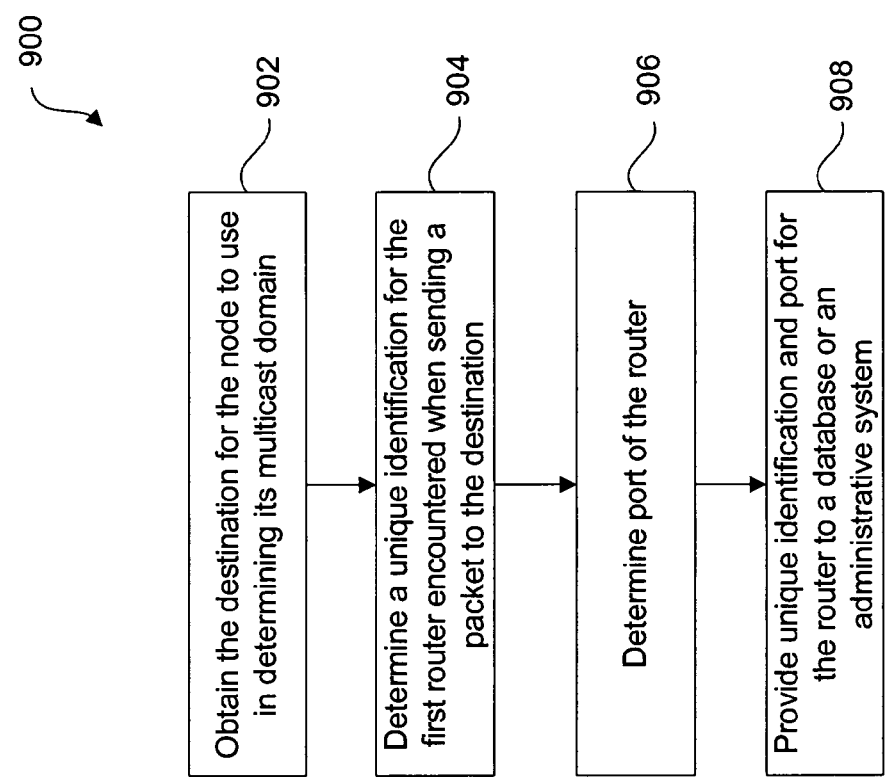
FIG. 9 is a flow diagram of an embodiment of a node's method for determining its multicast domain.

FIG. 9 is a flow diagram of an embodiment of a node's method 900 for determining its multicast domain. The destination for the node to use in determining its multicast domain is obtained 902. The destination may be determined by a system administrator and sent out to all nodes on the network. Alternatively, the nodes 106 may be configured to automatically use the administrative system 102 as the destination. In addition, a volunteer process may be used wherein the first node 106 that is started volunteers to be the destination. Those skilled in the art will appreciate that there are a number of ways in which a destination may be determined.

Then a unique identification for the first router encountered when sending a packet to the destination is determined 904. Those skilled in the art will appreciate that there are a number of ways in which a unique identification for the first router encountered may be determined. For example, the name of the router can be determined by making a gethostbyaddr call which makes it possible to determine a hostname given an IP address. Alternately the Address Resolution Protocol (ARP) can be used to determine the MAC address given an IP address.

The port of the router used is also determined 906 in this embodiment. By port the embodiments are attempting to identify which of the routers ports are being used for communication. This is commonly identified by knowing the IP address of the router encountered. As outlined above, the Traceroute program provides a method to determine the IP address of the first network device that decrements the IP hop count. Then the unique identification and port for the router are provided 908 to a database or an administrative system 102.

Figure 10:
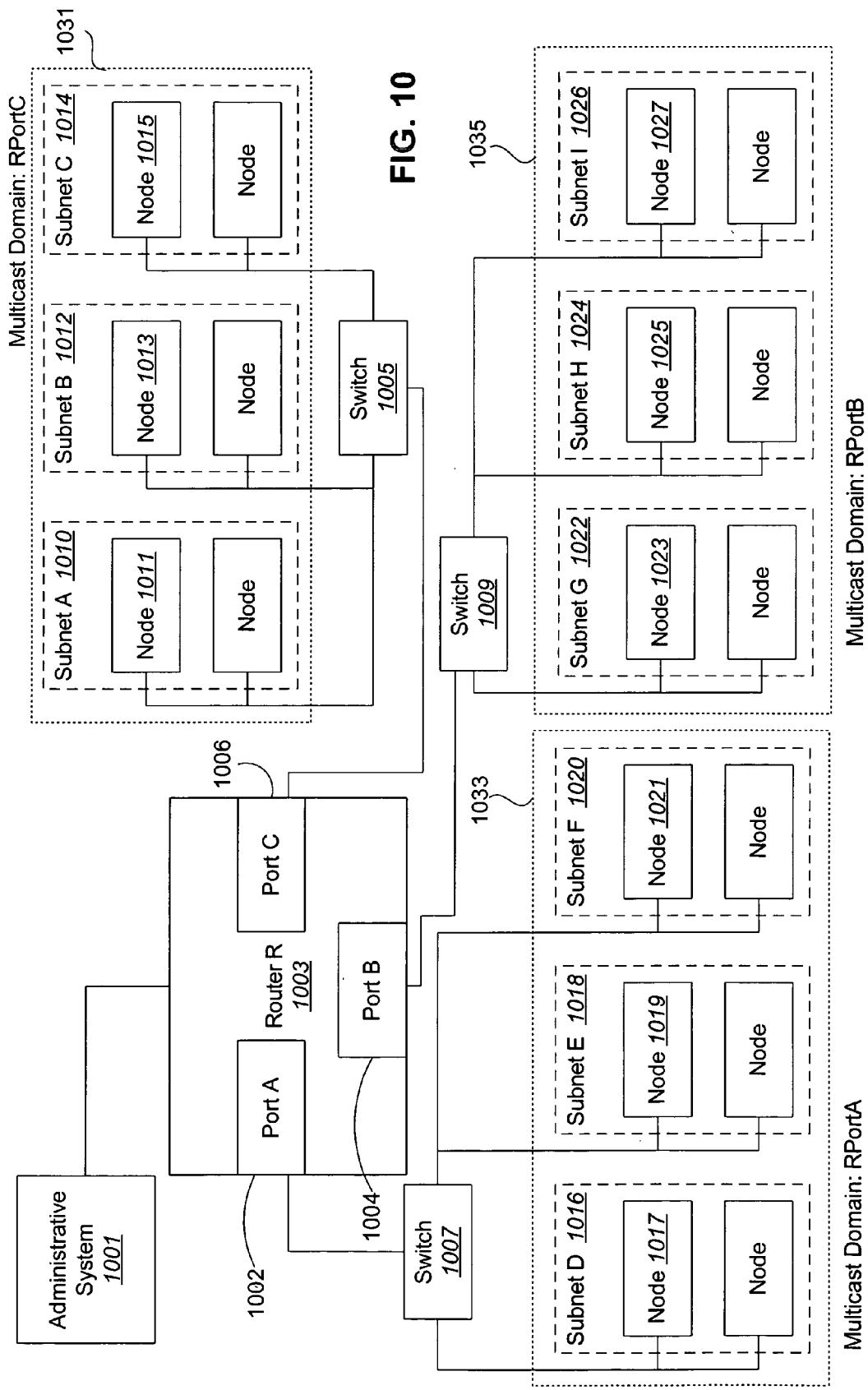
FIG. 10 is an exemplary diagram illustrating the alias domains established according to one embodiment of the method for discovering the alias domains.

FIG. 10 is an exemplary block diagram illustrating a computer network on which the present systems and methods may be implemented. In FIG. 10, an administrative system 1001 connects to a router 1003 that has three ports: port A 1002, port B 1004 and port C 1006. The administrative system 1001 may be any computer or computing device that has been configured to, or is being used for, storing the aggregated multicast domain information.

The router 1003 may be connected to three switches: a first switch 1005, a second switch 1007 and a third switch 1009. Each switch 1005, 1007, 1009 connects to three subnets. The first switch 1005 connects to three subnets 1010, 1012, and 1014. The second switch 1007 connects to three subnets 1016, 1018, and 1020. The third switch 1009 connects to three subnets 1022, 1024, and 1026. The network nodes or elements 1011, 1013, 1015, 1017, 1019, 1021, 1023, 1025 and 1027 represent computer systems or devices on the computer network. One or more of the nodes may use embodiments of the systems and methods herein for client initiated multicast domain discovery.

FIG. 10 is an exemplary diagram illustrating the alias domains established according to one embodiment of the method for discovering the alias domains. Once the nodes have all determined their multicast domains, the administrative system 1001 may store the multicast domain information. A multicast alias domain RPortC 1031 includes subnet A 1010, subnet B 1012, and subnet C 1014. A multicast domain RPortA 1033 includes the subnet D 1016, the subnet E 1018, and the subnet F 1020. A multicast domain RPortB 1035 includes the subnet G 1022, the subnet H 1024, and the subnet I 1026.

Having this information about the network will provide the administrator with detailed information about the network and provide for more intelligent replication of files. For example, using these embodiments it will be possible to determine the most efficient way to cascade a file through the system.

Figure 11:
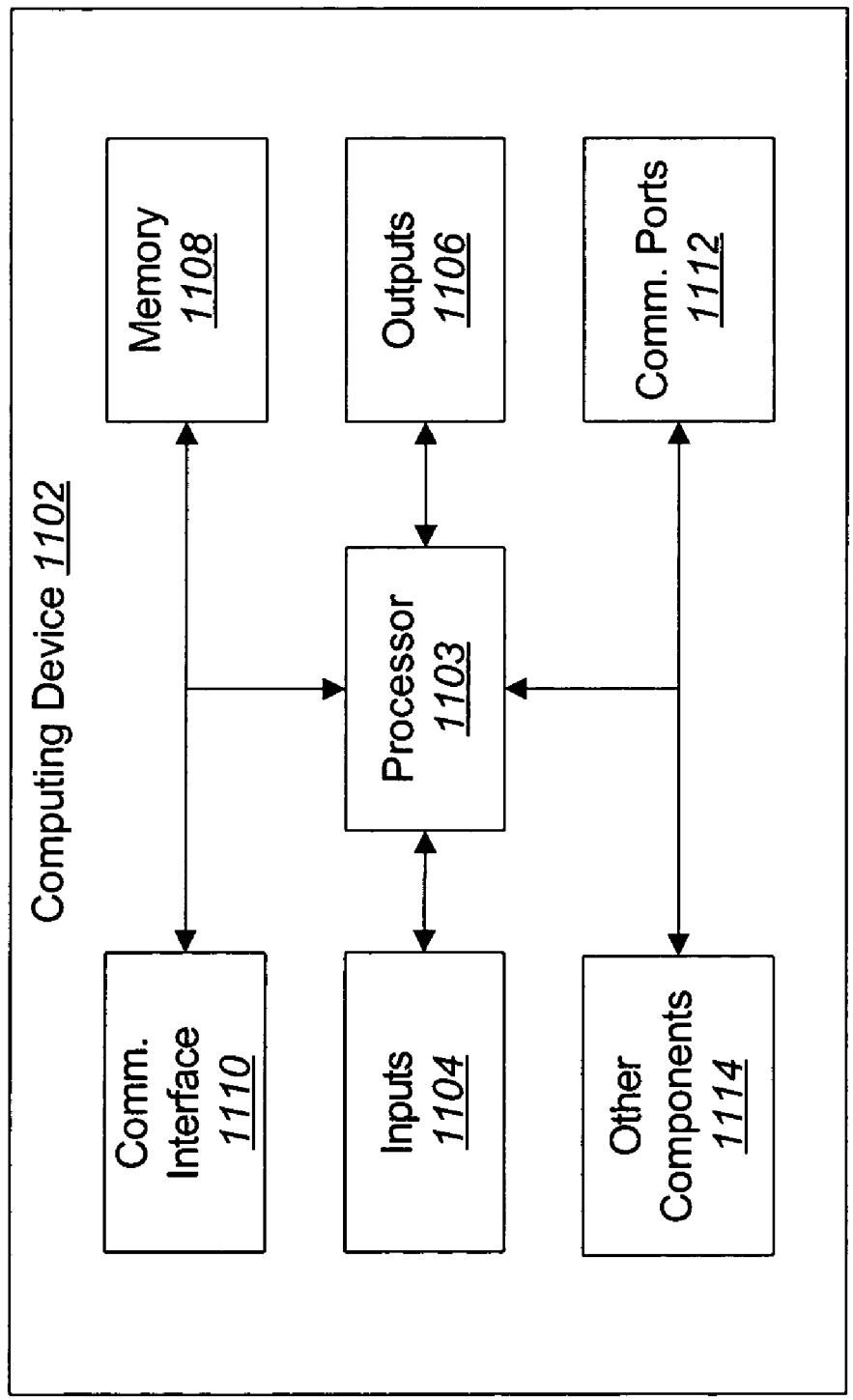
FIG. 11 is a block diagram illustrating the major hardware components typically utilized in a computing device.

FIG. 11 is a block diagram illustrating the major hardware components typically utilized in a computer or computing device used with embodiments herein. Computers and/or computing devices 1102 are known in the art and are commercially available. The major hardware components typically utilized in a computing device 1102 are illustrated in FIG. 11. A computing device 1102 typically includes a processor 1103 in electronic communication with input components or devices 1104 and/or output components or devices 1106. The processor 1103 is operably connected to input 1104 and/or output devices 1106 capable of electronic communication with the processor 1103, or, in other words, to devices capable of input and/or output in the form of an electrical signal. Embodiments of devices 1102 may include the inputs 1104, outputs 1106 and the processor 1103 within the same physical structure or in separate housings or structures.

The electronic device 1102 may also include memory 1108. The memory 1108 may be a separate component from the processor 1103, or it may be on-board memory 1108 included in the same part as the processor 1103. For example, microcontrollers often include a certain amount of on-board memory. The memory 1108 may be embodied in RAM, a hard drive, a CD-ROM drive, a DVD-ROM drive, network storage, etc. The memory 1108 is broadly defined as any electronic component capable of storing electronic information.

The processor 1103 is also in electronic communication with a communication interface 1110. The communication interface 1110 may be used for communications with other devices 1102. Thus, the communication interfaces 1110 of the various devices 1102 may be designed to communicate with each other to send signals or messages between the computing devices 1102. A network card or wireless card may be used to implement a communication interface 1110.

The computing device 1102 may also include other communication ports 1112. In addition, other components 1114 may also be included in the electronic device 1102.

Of course, those skilled in the art will appreciate the many kinds of different devices that may be used with embodiments herein. The computing device 1102 may be a one-chip computer, such as a microcontroller, a one-board type of computer, such as a controller, a typical desktop computer, such as an IBM-PC compatible, a Personal Digital Assistant (PDA), a Unix-based workstation, a router, etc. Accordingly, the block diagram of FIG. 11 is only meant to illustrate typical components of a computer or computing device 1102 and is not meant to limit the scope of embodiments disclosed herein.

FIG. 11 illustrates a computer system 1102 that includes or is in electronic communication with a machine-readable medium (memory) on which is stored a set of instructions according to embodiments herein. Although described in the context of a computer system 1102, the embodiments herein may be implemented in any suitable computer system comprising any suitable one or more integrated circuits.

Accordingly, computer system 1102 includes or is in communication with a computer-readable medium on which is stored a set of instructions (i.e., software) embodying any one, or all, of the methodologies described above. For example, software can reside, completely or at least partially, within main memory and/or within processors 1103. For the purposes of this specification, the term "computer-readable medium" shall be taken to include any mechanism that provides (i.e., stores and/or transmits) information in a form readable by a machine (e.g., a computer). For example, a computer-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for determining a multicast domain for a node on a computer network, the method comprising:
    obtaining a destination comprising a computer on a computer network, wherein the same destination is obtained for each of a plurality of nodes on the computer network that send data to the destination;
    determining a unique identification for a first router encountered when sending data from a node to the destination, wherein the node itself determines the unique identification for the first router;
    preparing a multicast domain identification based on the unique identification determined; and
    providing the multicast domain identification to a central location.

2. The method of claim 1, further comprising determining a specific port of the first router encountered and including a specific port identification in the multicast domain identification.

3. The method of claim 1, wherein the central location comprises an administrative system that includes a database of multicast domains.

4. The method of claim 1, wherein the multicast domain identification comprises a router or similar network device identification and a port identification.

5. The method of claim 1, further comprising reporting files that are in a multicast domain cache.

6. A computer-readable medium for storing program data, wherein the program data comprises executable instructions for implementing a method in a computing device for determining a multicast domain for a node on a computer network, the method comprising:
    obtaining a destination comprising a computer on a computer network, wherein the same destination is obtained for each of a plurality of nodes on the computer network that send data to the destination;
    determining a unique identification for a first router encountered when sending data from a node to the destination, wherein the node itself determines the unique identification for the first router;
    preparing a multicast domain identification based on the unique identification determined; and
    providing the multicast domain identification to a central location.

7. The computer-readable medium of claim 6, further comprising determining a specific port of the first router encountered and including a specific port identification in the multicast domain identification.

8. The computer-readable medium of claim 7, wherein the central location comprises an administrative system that includes a database of multicast domains.

9. The computer-readable medium of claim 8, wherein the multicast domain identification comprises a router or similar network device identification and a port identification.

10. The computer-readable medium of claim 9, further comprising reporting files that are in a multicast domain cache.

11. A system for determining a multicast domain for a node on a computer network, the system comprising:
   a computing device;
   a computer-readable medium that is part of the computing device or in electronic communication with the computing device, the computer-readable medium comprising executable instructions for implementing a method for determining the multicast domain for the computing device, the method comprising:
      obtaining a destination comprising a computer on the computer network, wherein the same destination is obtained for each of a plurality of nodes on the computer network that send data to the destination;
      determining a unique identification for a first router encountered when sending data from the computing device to the destination, wherein the node itself determines the unique identification for the first router;
      preparing a multicast domain identification based on the unique identification determined; and
      sending the multicast domain identification to an administrative system on the computer network.

12. The system of claim 11, further comprising determining a specific port of the first router encountered and including a specific port identification in the multicast domain identification.

13. The system of claim 11, wherein the multicast domain identification comprises a router or similar network device identification and a port identification.

14. The system of claim 11, wherein the method further comprises reporting files that are in a multicast domain cache on the computing device.

* * * * *

UNITED STATES PATENT AND TRADEMARK OFFICE
CERTIFICATE OF CORRECTION

PATENT NO.       : 7,299,246 B1  
APPLICATION NO.  : 10/759711  
DATED            : November 20, 2007  
INVENTOR(S)      : David A. Eatough Page 1 of 1

It is certified that error appears in the above-identified patent and that said Letters Patent is hereby corrected as shown below:

In col. 6, line 23 please delete "10.0.01.1" and replace it with --10.0.1.1--.

Signed and Sealed this

Seventeenth Day of June, 2008

JON W. DUDAS  
*Director of the United States Patent and Trademark Office*